(12) United States Patent
Yang et al.

(10) Patent No.: US 8,045,283 B2
(45) Date of Patent: Oct. 25, 2011

(54) AMPLITUDE-BASED APPROACH FOR DETECTION AND CLASSIFICATION OF HARD-DISC DEFECT REGIONS

(75) Inventors: Shaohua Yang, San Jose, CA (US); George Mathew, San Jose, CA (US); Yang Han, Santa Clara, CA (US); Zongwang Li, San Jose, CA (US); Yuan Xing Lee, San Jose, CA (US)

(73) Assignee: LSI Corporation, Milpitas, CA (US)

(*) Notice: Subject to any disclaimer, the term of this patent is extended or adjusted under 35 U.S.C. 154(b) by 0 days.

(21) Appl. No.: 12/729,312

(22) Filed: Mar. 23, 2010

(65) Prior Publication Data

US 2011/0235490 A1     Sep. 29, 2011

(51) Int. Cl.
*G11B 27/36* (2006.01)
*G11B 5/02* (2006.01)

(52) U.S. Cl. ............................................ 360/31; 360/25

(58) Field of Classification Search .................. None
See application file for complete search history.

(56) References Cited

U.S. PATENT DOCUMENTS

| | | | |
|---|---|---|---|
| 6,175,459 B1 * | 1/2001 | Tomita .............................. 360/53 |
| 6,414,806 B1 | 7/2002 | Gowda et al. |
| 6,665,134 B2 | 12/2003 | Ottesen et al. |
| 6,671,111 B2 | 12/2003 | Ottesen et al. |
| 7,237,173 B2 | 6/2007 | Morita et al. |
| 7,646,556 B1 | 1/2010 | Kose et al. |
| 7,679,853 B2 | 3/2010 | Song et al. |
| 2002/0048108 A1 * | 4/2002 | Chu et al. ........................ 360/53 |
| 2008/0104486 A1 | 5/2008 | Kanaoka |
| 2008/0262643 A1 | 10/2008 | Creigh et al. |
| 2009/0235146 A1 | 9/2009 | Tan et al. |
| 2009/0268848 A1 | 10/2009 | Tan et al. |
| 2009/0271670 A1 | 10/2009 | Tan et al. |
| 2010/0226033 A1 * | 9/2010 | Tan et al. ........................ 360/53 |

* cited by examiner

*Primary Examiner* — Daniell L Negron
*Assistant Examiner* — Regina N Holder
(74) *Attorney, Agent, or Firm* — Mendelsohn, Drucker & Associates, P.C.; Steve Mendelsohn

(57) ABSTRACT

In a hard-disc drive, a defect region on the hard disc is classified as corresponding to either thermal asperity (TA) or media defect (MD) by generating two statistical measures. A first measure (e.g., $\alpha_1$) is based on (i) the magnitudes of one or both of signal values (e.g., equalizer input or output signal values) and the corresponding expected values of those signal values and (ii) the signs of one or both of the signal values and the expected signal values. A second measure (e.g., $\alpha_2$) is based on the magnitudes of one or both of the signal values and the expected signal values, but not the signs of either the signal values or the expected signal values. The two measures are then compared to determine whether the defect region corresponds to TA or MD.

23 Claims, 3 Drawing Sheets

AMPLITUDE-BASED APPROACH FOR
DETECTION AND CLASSIFICATION OF
HARD-DISC DEFECT REGIONS

CROSS-REFERENCE TO RELATED
APPLICATIONS

The subject matter of this application is related to the subject matter of U.S. patent application Ser. No. 11/319,319 filed Dec. 28, 2005, U.S. patent application Ser. No. 12/111,255 filed Apr. 29, 2008, and U.S. patent application Ser. No. 12/707,820 filed Feb. 18, 2010, the teachings of all of which are incorporated herein by reference in their entirety.

BACKGROUND

1. Field of the Invention

The present invention relates to hard-disc drives, and, in particular, to techniques for detecting defect regions on a hard disc of a hard-disc drive and classifying whether the defect regions correspond to thermal asperity or media defect.

2. Description of the Related Art

This section introduces aspects that may help facilitate a better understanding of the invention. Accordingly, the statements of this section are to be read in this light and are not to be understood as admissions about what is prior art or what is not prior art.

An ideal hard disc of a hard-disc drive has a data-storage surface that is perfectly flat and of perfectly uniform material composition. In reality, however, hard discs are not perfectly flat and have varying material composition. As a result of this, as well as for manufacturing reasons, different types of defects can be present on hard discs. It can be difficult to recover data read from defect regions, and the intensity of difficulty depends on the type of defect. In drop-out type defect regions, the amplitude of the analog read-head output signal is significantly lower than the read-head output signal amplitude for normal regions that are relatively flat and of relatively uniform material composition. Data written on such defect regions may be recovered if the read-head output signal is appropriately amplified and conditioned by the electronics that process the read-head output signal. In this document, we refer to such drop-out type defects as "media defects" (MD). It is desirable to determine the locations of MD regions on hard discs so that the signals read from those MD regions can be properly processed to recover the data accurately.

Sometimes, the topography of a hard-disc region is so varied that the read head will come into physical contact with certain regions when the read head is positioned over these regions of the spinning hard disc due to the asperities present on the disc. Such regions are referred to as thermal asperity (TA) regions, due to the frictional heat generated from the physical contact between the read head and the varied hard disc. It is desirable to determine the locations of TA regions on hard discs so that those regions can be avoided during both data write and data read operations to prevent damage to the read head.

Current and older hard-disc drives employed MR (magneto resistive) read heads or GMR (giant MR) read heads. For such read heads, read-head output signals corresponding to MD regions have amplitudes that are significantly smaller than the signal amplitudes for normal regions, while read-head output signals corresponding to TA regions have amplitudes that are significantly greater than the normal-region signal amplitudes due to a shift in baseline resulting from the TA effect. As such, MD regions can be located on a hard disc of a hard-disc drive employing an MR/GMR read head by looking for lower-than-normal signal-amplitude regions, while TA regions can be located on the hard disc by looking for significant increases in signal baseline compared to normal signal-amplitude regions.

Newer hard-disc drives employ TMR (tunneling MR) read heads. For TMR read heads, TA regions can be mistaken for MD regions because read-head output signals corresponding to both MD regions and TA regions have amplitudes that are significantly smaller than the signal amplitudes for normal regions. As such, the conventional signal-processing techniques used to detect and classify MD and TA regions for hard-disc drives employing MR/GMR read heads cannot be used to detect and classify MD and TA regions for hard-disc drives employing TMR read heads.

SUMMARY

In one embodiment, the present invention is a machine-implemented method for classifying a defect region on a hard disc as associated with either thermal asperity (TA) or media defect (MD). The machine generates a first measure based on (i) magnitudes of one or both of signal values corresponding to the defect region and corresponding expected signal values and (ii) signs of one or both of the signal values and the expected signal values. The machine generates a second measure based on the magnitudes of one or both of the signal values and the expected signal values, but not the signs of either the signal values or the expected signal values. The machine compares the first and second measures and determines whether the defect region is associated with TA or MD based on the comparison.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
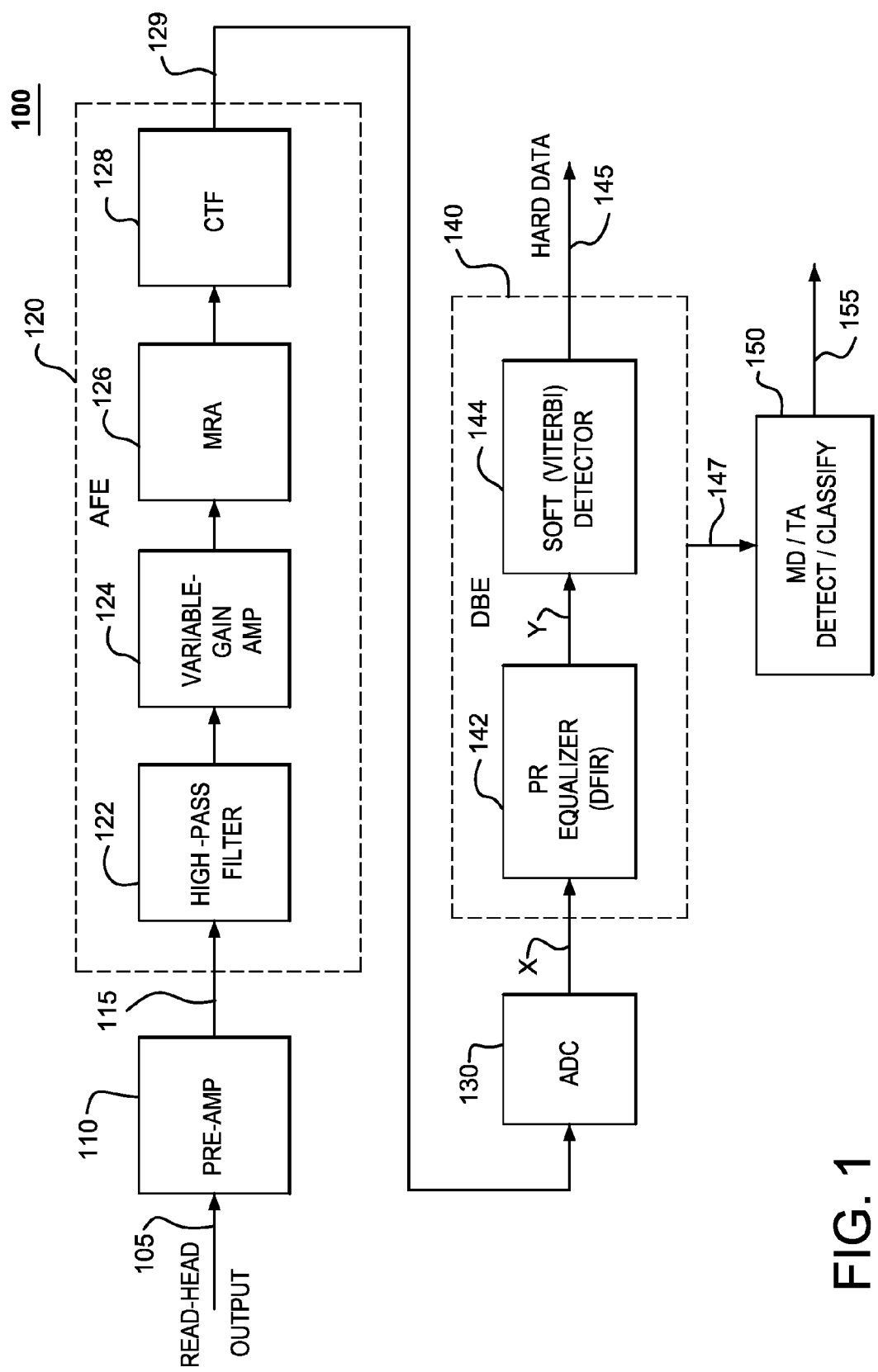
FIG. 1 shows a high-level block diagram of a read channel for a hard-disc drive employing a tunneling magneto resistive (TMR) read head, according to one embodiment of the present invention.

FIG. 1 shows a high-level block diagram of a read channel 100 for a hard-disc drive employing a tunneling magneto resistive (TMR) read head, according to one embodiment of the present invention. The (conventional) main signal-processing path of read channel 100 receives analog read-head output signal 105 from the TMR read head (not shown) and outputs binary (hard-decision) output data signal 145.

As shown in FIG. 1, read channel 100 includes pre-amplifier 110, analog front end (AFE) 120, analog-to-digital converter (ADC) 130, and digital back end (DBE) 140. Pre-amplifier 110 amplifies and conditions read-head output signal 105 to ensure that the signal amplitude and frequency components are within specified ranges for processing by AFE 120, which further amplifies and conditions the preamplified signal 115 from pre-amplifier 110. ADC 130 digitizes the AFE output signal 129 to produce multi-bit digital signal X (consisting of ADC output samples x[n]) for digital signal processing by DBE 140 that generates binary output data signal 145.

As represented in FIG. 1, AFE 120 includes high-pass filter 122, variable-gain amplifier 124, magneto resistive asymmetry (MRA) compensation module 126, and continuous-time low-pass filter 128, while DBE 140 includes partial-response (PR) equalizer 142 and soft (e.g., Viterbi) detector 144. Of particular interest to the present invention, PR equalizer 142 receives digitized ADC output signal X from ADC 130 and generates multi-bit equalized signal Y (consisting of equalizer output samples y[n]), which soft detector 144 processes to generate binary output data signal 145. PR equalizer 142 can be, but does not have to be, implemented as a digital finite impulse response (DFIR) filter.

In addition, TMR read channel 100 includes media defect (MD)/thermal asperity (TA) detection and classification subsystem 150, which receives and processes signal 147 from DBE 140 to detect the locations of defect regions on the hard disc and classify each detected defect region as being either an MD region or a TA region, which information is represented in signal 155. In one implementation, signal 147 includes the ADC output signal X generated by ADC 130. In another implementation, signal 147 includes the equalized signal Y generated by PR equalizer 142.

Figure 2:
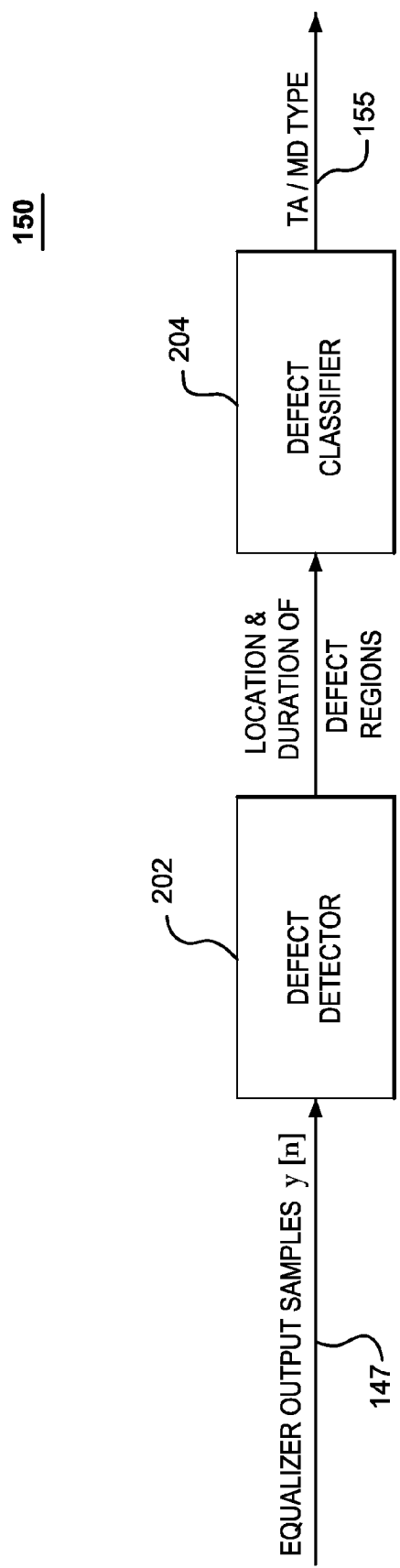
FIG. 2 shows a high-level block diagram of the MD/TA detection and classification (D&C) subsystem of FIG. 1 according to one possible implementation of the present invention.

FIG. 2 shows a high-level block diagram of MD/TA detection and classification (D&C) subsystem 150 of FIG. 1 according to one possible implementation of the present invention. In this particular implementation, D&C subsystem 150 processes equalizer output samples y[n] of signal Y of FIG. 1 to detect and classify defect regions on a hard disc. In particular, D&C subsystem 150 includes defect detector 202, which processes the equalizer output samples y[n] to detect the location and duration of defect regions, and defect classifier 204, which processes statistics generated by defect detector 202 to classify each detected defect region as being either an MD region or a TA region.

D&C subsystem 150 generates two statistical measures $\alpha_1$ and $\alpha_2$ characterizing the equalizer output samples y[n] according to Equations (1) and (2), respectively, as follows:

$$\alpha_1 = E[y[n]\hat{y}[n]]/E[\hat{y}[n]\hat{y}[n]] \approx E[y[n]\text{sign}(\hat{y}[n])]/E[|\hat{y}[n]|] \quad (1)$$

$$\alpha_2 = E[|y[n]|]/E[|\hat{y}[n]|] \quad (2)$$

where $\hat{y}[n]$ is the expected value of multi-bit equalizer output sample y[n], the function E[.] represents the expectation function, and the function sign(.) returns the sign of the operand.

Depending on the particular implementation, the expected sample values $\hat{y}[n]$ can be generated in a number of different ways. One way is to construct $\hat{y}[n]$ by convolving the hard-decision bits (represented by 1 and −1) of output signal 145 generated by soft detector 144 with an appropriate target polynomial.

Another way is to generate long-term average values of the equalizer output sample y[n] for different short-term bit patterns. For example, if test data written to the hard disc followed a 2T sequence (i.e., 11001100 . . . ), then different long-term average values could be generated for bit values at the center of different local bit patterns. In particular, one long-term average value could be generated for the bit at the center of the local 3-bit pattern "110", another for "100", another for "001", and yet another for "011". The appropriate long-term average, e.g., stored in a lookup table, could then be used for the expected sample value $\hat{y}[n]$ in Equations (1) and (2). Note that the expected sample values $\hat{y}[n]$ are generated for data stored in normal regions (i.e., not those associated with MD or TA). Those skilled in the art will understand that there may be other ways for generating the expected sample values $\hat{y}[n]$.

For normal (i.e., defect-free) regions and as implied by the term "expected", the equalizer output samples y[n] are substantially equivalent (in both sign and magnitude) to the expected sample values $\hat{y}[n]$. However, as described earlier, in defect regions (associated with either MD or TA), the magnitudes of the equalizer output samples y[n] are significantly smaller than the magnitudes of the expected sample values $\hat{y}[n]$.

Furthermore, in MD defect regions, where the read-head output signal 105 is substantially an attenuated version of what the signal would be for a defect-free region, the signs of the equalizer output samples y[n] will typically match the signs of the expected sample values $\hat{y}[n]$. However, in TA defect regions, where the read-head output signal 105 is extremely noisy, the signs of the equalizer output samples y[n] are substantially random and will not be well correlated with the signs of the expected sample values $\hat{y}[n]$.

These different characteristics of defect regions vs. defect-free regions and MD defect regions vs. TA defect regions were exploited in designing the equations for generating statistical measures $\alpha_1$ and $\alpha_2$. In particular, statistical measure $\alpha_1$ of Equation (1) is a function of both the signs and the magnitudes of both the equalizer output samples y[n] and the expected sample values $\hat{y}[n]$, while statistical measure $\alpha_2$ of Equation (2) is a function of the magnitudes, but not the signs, of those two values. If the signs of the equalizer output samples y[n] and the expected sample values $\hat{y}[n]$ are not well correlated, then the magnitude of statistical measure $\alpha_1$ will be smaller than the magnitude of statistical measure $\alpha_2$.

Defect detector 202 of FIG. 2 can detect defect regions comparing statistical measure $\alpha_1$ to a specified threshold value T that is less than 1 and preferably close to 0. If $(\alpha_1 < T)$, then defect detector 202 determines that a defect region has been detected; otherwise, a defect region is not detected. In an alternative implementation, statistical measure $\alpha_2$ could be used in place of statistical measure $\alpha_1$ with the same threshold value T or a different threshold value.

When defect detector 202 detects a defect region, defect classifier 204 compares the two statistical measures $\alpha_1$ and $\alpha_2$ to each other to classify the defect region as being either an MD region or a TA region. In particular, if $(\alpha_1 \ll \alpha_2)$, then the detected defect region is determined to be a TA region. Otherwise, $(\alpha_1 \approx \alpha_2)$ and the detected defect region is determined to be an MD region. One way to implement the comparison of $\alpha_1$ and $\alpha_2$ is to compare $\alpha_1$ to a specified fraction of $\alpha_2$, where the specified fraction is an appropriate value less than 1. If $\alpha_1$ is less than that specified fraction of $\alpha_2$, then the detected defect region is a TA region; otherwise, an MD region. Another way to implement the comparison is to compare the ratio of $\alpha_1$ to $\alpha_2$ to a threshold equal, for example, to the same specified fraction. If the ratio is less than the threshold, then the detected defect region is a TA region; otherwise, an MD region.

In one implementation, by manipulating Equations (1) and (2), the comparison of defect classifier 204 can be performed using Equation (3) as follows:

$$E[y[n]\hat{y}[n]]*E[|\hat{y}[n]|] \lll E[\hat{y}[n]\hat{y}[n]]*E[|y[n]|] \quad (3)$$

In another implementation, the comparison of defect classifier 204 can be performed in a simplified manner using Equation (4) as follows:

$$E[y[n]\text{sign}(\hat{y}[n])] \lll E[|y[n]|] \quad (4)$$

Figure 3:
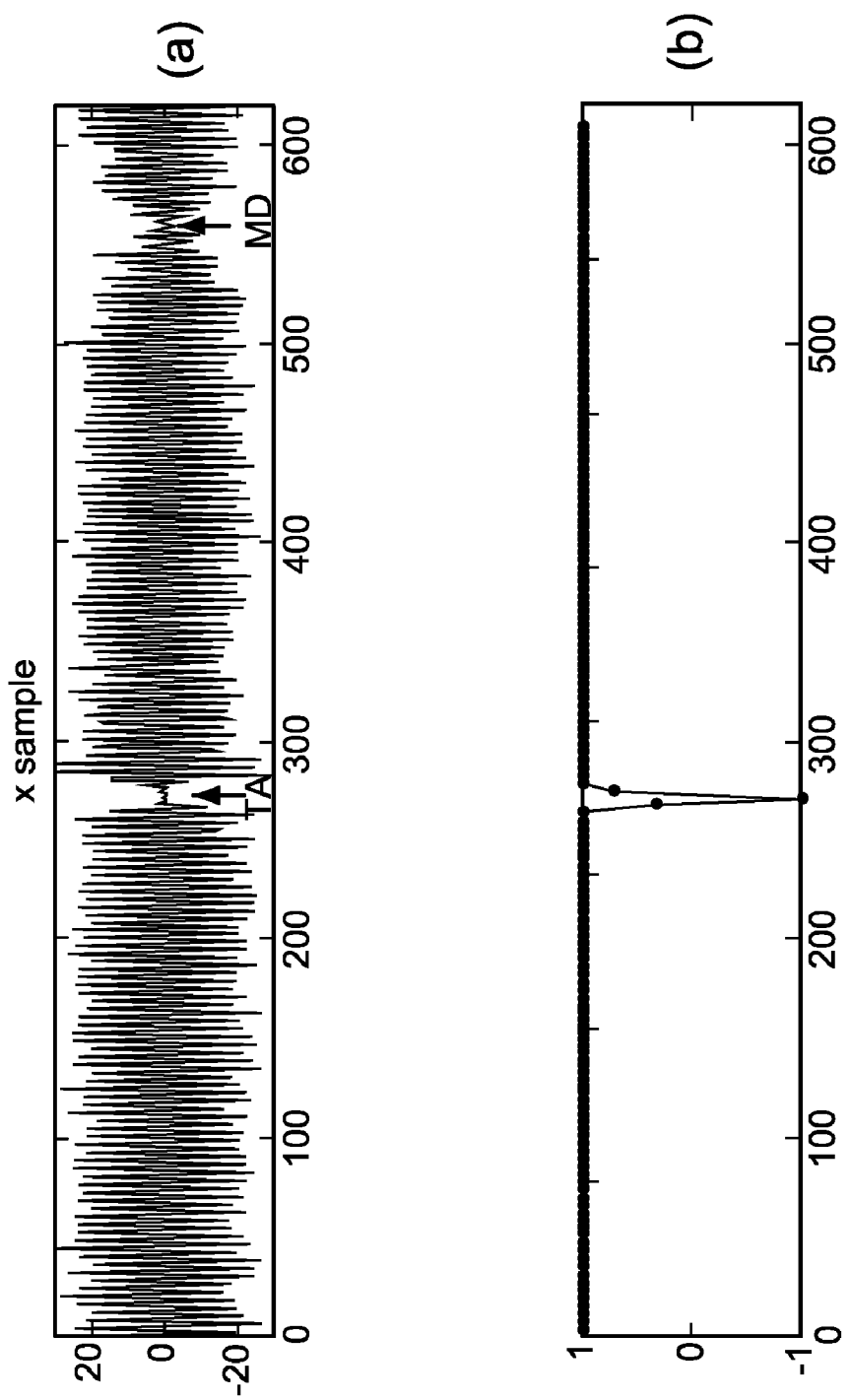
FIG. 3 graphically represents one possible scheme for classifying regions as corresponding to either MD or TA.

FIG. 3(*a*) graphically represents an exemplary sequence of equalizer output samples y[n] for a hard disc, where the X axis represents sample index number, and the Y axis represents sample amplitude. In this example, the hard disc has (i) a TA defect region occurring between sample no. 200 and sample no. 300 and (ii) an MD defect region occurring between sample no. 500 and sample no. 600. FIG. 3(b) graphically represents, in the Y axis, the ratio of statistical measure $\alpha_1$ of Equation (1) to statistical measure $\alpha_2$ of Equation (2) for the corresponding samples of FIG. 3(a). As seen in FIG. 3(a), the equalizer output samples y[n] for both the TA defect region and the MD defect region have reduced amplitudes. As such, characterizing sample amplitudes might provide an acceptable scheme for detecting the presence of TA/MD defect regions, but might not provide a sufficiently accurate scheme for classifying a detected defect region as being either a TA defect region or an MD defect region. As seen in FIG. 3(b), however, the ratio of statistical measures is very different between the TA defect region and the MD defect region. This implies that a scheme based on the ratio of statistical measures (or an alternative scheme derived based on the characteristics of those statistical measures, such as those represented by Equations (3) and (4)) can be effectively used to classify detected defect region as being either a TA defect region or an MD defect region.

In general, a detected defect region can be classified as being either a TA or MD defect region using signal values (e.g., x[n] or y[n]) and expected values (e.g., $\hat{x}[n]$ or $\hat{y}[n]$) for those signals. For example, the signal values could be equalizer output signal values y[n], and the expected signal values could be expected equalizer output signal values $\hat{y}[n]$, as in the scheme of Equations (1) and (2), the scheme of Equation (3), and the scheme of Equation (4). In other exemplary embodiments, the signal values could be equalizer input signal values (e.g., ADC output signal values x[n]), and the expected signal values could be expected equalizer input signal values (e.g., expected ADC output signal values $\hat{x}[n]$).

In any case, (at least) two statistical measures are generated: a first measure that is dependent on magnitudes and signs and a second measure that is dependent on magnitudes, but not signs. The two statistical measures are then compared to determine whether the detected defect region corresponds to TA or MD.

In an exemplary scheme based on Equations (1) and (2), measure $\alpha_1$ of Equation (1) is dependent on both the magnitudes and the signs of both the signal values y[n] and the expected signal values $\hat{y}[n]$, while measure $\alpha_2$ of Equation (2) is dependent on the magnitudes of the signal values y[n] and the expected signal values $\hat{y}[n]$, but not the signs. In the exemplary scheme based on Equation (3), the left-hand side of Equation (3) is a measure that is dependent on both the magnitudes and the signs of both the signal values y[n] and the expected signal values $\hat{y}[n]$, while the right-hand side of Equation (3) is a measure that is dependent on the magnitudes of both the signal values y[n] and the expected signal values $\hat{y}[n]$, but not the signs of either. In the exemplary scheme based on Equation (4), the left-hand side of Equation (4) is a measure that is dependent on both the magnitudes and the signs of the signal values y[n], but only on the signs of the expected signal values $\hat{y}[n]$, while the right-hand side of Equation (4) is a measure that is dependent on only the magnitudes of only the signal values y[n].

Note that, for a particular scheme, the two measures do not each need to be based on both the signal values and the expected values of those signal values. For example, in the scheme of Equation (4), the right-hand side is based on the signal values y[n], but not on the expected signal values $\hat{y}[n]$. Furthermore, the left-hand side of Equation (4) is based on the sign and magnitude of the signal values y[n], but only on the sign of the expected signal values $\hat{y}[n]$.

Generalizing from these different exemplary schemes, the first measure is based on (i) the magnitudes of one or both of the signal values and the expected signal values and (ii) the signs of one or both of the signal values and the expected signal values, while the second measure is based on the magnitudes of one or both of the signal values and the expected signal values, but not the signs of either.

In one possible implementation of MD/TA D&C subsystem 150, when the gap between the end of one defect region and the beginning of the next defect region is less than a specified distance apart, then the two defect regions and the intervening normal region are merged into one combined defect region for classification processing, where the combined defect region spans from the beginning of the first defect region until the end of the second defect region.

To support high-data-rate operation, the ratio can be computed once in, for example, 4 bits, resulting in a quarter-rate implementation compared to the full-rate implementation described previously where measures are generated for every bit.

Although the present invention has been described in the context of a read channel for a TMR (tunneling magnetoresistive) read head, those skilled in the art will appreciate that the present invention can be implemented in the context of other types of read heads, including, but not limited to, MR (magneto resistive) read heads or GMR (giant MR) read heads.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A machine-implemented method for classifying a defect region on a hard disc as associated with either thermal asperity (TA) or media defect (MD), the method comprising:
   (a) the machine generating a first measure based on (i) magnitudes of one or both of signal values corresponding to the defect region and corresponding expected signal values and (ii) signs of one or both of the signal values and the expected signal values;
   (b) the machine generating a second measure based on the magnitudes of one or both of the signal values and the expected signal values, but not the signs of either the signal values or the expected signal values;
   (c) the machine comparing the first and second measures; and
   (d) the machine determining whether the defect region is associated with TA or MD based on the comparison of step (c).

2. The invention of claim 1, wherein the signal values are analog-to-digital converter (ADC) output values.

3. The invention of claim 1, wherein the signal values are equalizer input values.

4. The invention of claim 1, wherein the signal values are equalizer output values.

5. The invention of claim 1, wherein the machine compares the first and second measures by determining whether the first measure is less than a specified fraction of the second measure, where the specified fraction is less than one.

6. The invention of claim 1, wherein the machine compares the first and second measures by comparing a ratio of the first measure and the second measure to a specified threshold.

7. The invention of claim 1, wherein the expected signal values are mean values of the signal values.

8. The invention of claim 7, wherein the expected signal values are functions of bit patterns associated with the signal values and one or more adjacent signal values.

9. The invention of claim 1, wherein the expected signal values are reconstructed from hard decision values corresponding to the signal values.

10. The invention of claim 9, wherein the expected signal values are reconstructed by convolving the hard decision values with a target polynomial.

11. The invention of claim 1, wherein the first measure is based on a ratio of (i) an expectation of a product of a signal value and its corresponding expected signal value and (ii) an expectation of a square of the corresponding expected signal value.

12. The invention of claim 1, wherein the first measure is based on a ratio of (i) an expectation of a product of a signal value and the sign of its corresponding expected signal value and (ii) an expectation of the magnitude of the corresponding expected signal value.

13. The invention of claim 1, wherein the second measure is based on a ratio of (i) an expectation of the magnitude of the signal value and (ii) an expectation of the magnitude of its corresponding expected signal value.

14. The invention of claim 1, wherein:
   the first measure is a product of (i) an expectation of a product of a signal value and its corresponding expected signal value and (ii) an expectation of the magnitude of the corresponding expected signal value; and
   the second measure is a product of (i) an expectation of a square of the corresponding expected signal value and (ii) an expectation of the magnitude of the signal value.

15. The invention of claim 1, wherein:
   the first measure is an expectation of a product of a signal value and the sign of its corresponding expected signal value; and
   the second measure is an expectation of an absolute value of the signal value.

16. The invention of claim 1, further comprising detecting location of the defect region by comparing one of the first measure and the second measure to a specified threshold.

17. The invention of claim 1, wherein:
   step (c) comprises the machine comparing the first measure to the second measure; and
   step (d) comprises:
      (d1) the machine determining that the defect region is associated with TA if the comparison of step (c) produces a first result; and
      (d2) the machine determining that the defect region is associated with MD if the comparison of step (c) produces a second result different from the first result.

18. A machine for classifying a defect region on a hard disc as associated with either thermal asperity (TA) or media defect (MD), the machine comprising:
   (a) means for generating a first measure based on (i) magnitudes of one or both of signal values corresponding to the defect region and corresponding expected signal values and (ii) signs of one or both of the signal values and the expected signal values;
   (b) means for generating a second measure based on the magnitudes of one or both of the signal values and the expected signal values, but not the signs of either the signal values or the expected signal values;
   (c) means for comparing the first and second measures; and
   (d) means for determining whether the defect region is associated with TA or MD based on the comparison of means (c).

19. The invention of claim 18, wherein the machine is a digital signal processor.

20. The invention of claim 18, wherein the machine is a hard-disc drive.

21. The invention of claim 18, wherein:
means (c) compares the first measure to the second measure; and
means (d):
- (d1) determines that the defect region is associated with TA if the comparison of means (c) produces a first result; and
- (d2) determines that the defect region is associated with MD if the comparison of means (c) produces a second result different from the first result.

22. A non-transitory machine-readable storage medium, having encoded thereon program code, wherein, when the program code is executed by a machine, the machine implements a method for classifying a defect region on a hard disc as associated with either thermal asperity (TA) or media defect (MD), the method comprising:
- (a) generating a first measure based on (i) magnitudes of one or both of the signal values corresponding to the defect region and corresponding expected signal values and (ii) signs of one or both of the signal values and the expected signal values;
- (b) generating a second measure based on the magnitudes of one or both of the signal values and the expected signal values, but not the signs of either the signal values or the expected signal values;
- (c) comparing the first and second measures; and
- (d) determining whether the defect region is associated with TA or MD based on the comparison of step (c).

23. The invention of claim 22, wherein:
step (c) comprises comparing the first measure to the second measure; and
step (d) comprises:
- (d1) determining that the defect region is associated with TA if the comparison of step (c) produces a first result; and
- (d2) determining that the defect region is associated with MD if the comparison of step (c) produces a second result different from the first result.

* * * * *